US012568934B2

(12) United States Patent
Hill

(10) Patent No.: US 12,568,934 B2
(45) Date of Patent: Mar. 10, 2026

(54) CLIP FOR SECURING A LOCATING DEVICE TO A STRAP

(71) Applicant: Norman M. Hill, Bothell, WA (US)

(72) Inventor: Norman M. Hill, Bothell, WA (US)

( * ) Notice: Subject to any disclaimer, the term of this patent is extended or adjusted under 35 U.S.C. 154(b) by 60 days.

(21) Appl. No.: 18/492,971

(22) Filed: Oct. 24, 2023

(65) Prior Publication Data

US 2024/0156059 A1 May 16, 2024

Related U.S. Application Data

(60) Provisional application No. 63/381,275, filed on Oct. 27, 2022.

(51) Int. Cl.
*A01K 27/00* (2006.01)
*A01K 29/00* (2006.01)

(52) U.S. Cl.
CPC .......... *A01K 27/001* (2013.01); *A01K 29/005* (2013.01)

(58) Field of Classification Search
CPC ............................. A01K 27/001; A01K 29/005
USPC ......................................................... 340/500
See application file for complete search history.

(56) References Cited

U.S. PATENT DOCUMENTS

| | | | |
|---|---|---|---|
| 6,661,344 | B2 | 12/2003 | Bowling |
| 7,786,875 | B2 | 8/2010 | Wu |
| 7,872,588 | B2 | 1/2011 | Potter et al. |
| 9,799,185 | B2 | 10/2017 | Jessop |
| 10,912,282 | B2 | 2/2021 | Mckee et al. |

| | | | |
|---|---|---|---|
| 11,310,996 | B2 | 4/2022 | Griffioen et al. |
| 2007/0034165 | A1 | 2/2007 | Yang |
| 2017/0035156 | A1* | 2/2017 | Wright ................. A45C 13/008 |
| 2017/0206446 | A1* | 7/2017 | Lesesky ........... G06K 19/07764 |
| 2020/0107522 | A1 | 4/2020 | Kersey et al. |
| 2020/0333421 | A1* | 10/2020 | Perkins ................. G04G 21/04 |
| 2020/0337162 | A1 | 10/2020 | Perkins et al. |
| 2022/0006143 | A1* | 1/2022 | Graham ............... H01Q 1/2225 |

(Continued)

FOREIGN PATENT DOCUMENTS

| | | |
|---|---|---|
| CN | 306789903 | 8/2021 |
| CN | 214629047 U | 11/2021 |
| CN | 306911381 S | 11/2021 |

(Continued)

OTHER PUBLICATIONS https://www.etsy.com/listing/1074880758/holder-for-apple-airtag-tie-on-with-shoe?show_sold_out_detail=1&ref=nla_listing_details (Year: 2022).*

(Continued)

*Primary Examiner* — Omar Casillashernandez
(74) *Attorney, Agent, or Firm* — Michael R. Schacht; Bronte Brillantes; Schacht Law Office, Inc.

(57) ABSTRACT

A clip for securing a locating device relative to an item comprises a base portion, a plurality of claw portions, and an attachment chamber. Each of the plurality of claw portions extends from the base portion. The attachment chamber defines a first portion and a second portion. The first portion of the attachment chamber is sized and dimensioned to receive at least a portion of the locating device. The second portion of the attachment chamber is sized and dimensioned to receive at least a portion of the item. The claw portions are sized and dimensioned to secure the locating device within the first portion of the attachment chamber to inhibit movement of the locating device and the item relative to the clip.

20 Claims, 9 Drawing Sheets

(56)　　　　　References Cited

U.S. PATENT DOCUMENTS

| | | | |
|---|---|---|---|
| 2022/0151207 | A1 | 5/2022 | Mott et al. |
| 2022/0183259 | A1 | 6/2022 | Oswald |

FOREIGN PATENT DOCUMENTS

| | | |
|---|---|---|
| KR | 20210060786 A | 5/2021 |
| WO | 2021203166 | 10/2021 |
| WO | 2024091898 A1 | 5/2024 |

OTHER PUBLICATIONS amazon.com; Buddy Armor; https://www.amazon.com/BuddyArmor-Breakaway-Engraving-Lightweight-Resistant/dp/B0CJY6B99R/ref=sr_1_1_sspa?crid=YIWVO98B9EG5&keywords=buddy+armor+cat&qid=1701216921&sprefix=bodyarmor+ca%2Caps%2C152&sr=8-1-spons&sp_csd=d2lkZ2V0TmFtZT1zcF9hdGY&psc=1 (link doesn't work anymore); 1 page.

Hedeco; Snap Fit Case for Airtag; 1 page.

International Searching Authority; International Search Report and Written Opinion; Feb. 28, 2024; 10 pages.

NIAGRA3D; Holder for AppleAirTag—tie on with shoe laces, band or zip ties; Etsy; Publication online Apr. 2022.

Nitacawo, Airtag dog pet collar cat holder case Apple Silent Slide on tag flexible no jiggle free, Dec. 31, 2021.

* cited by examiner

FIG. 1
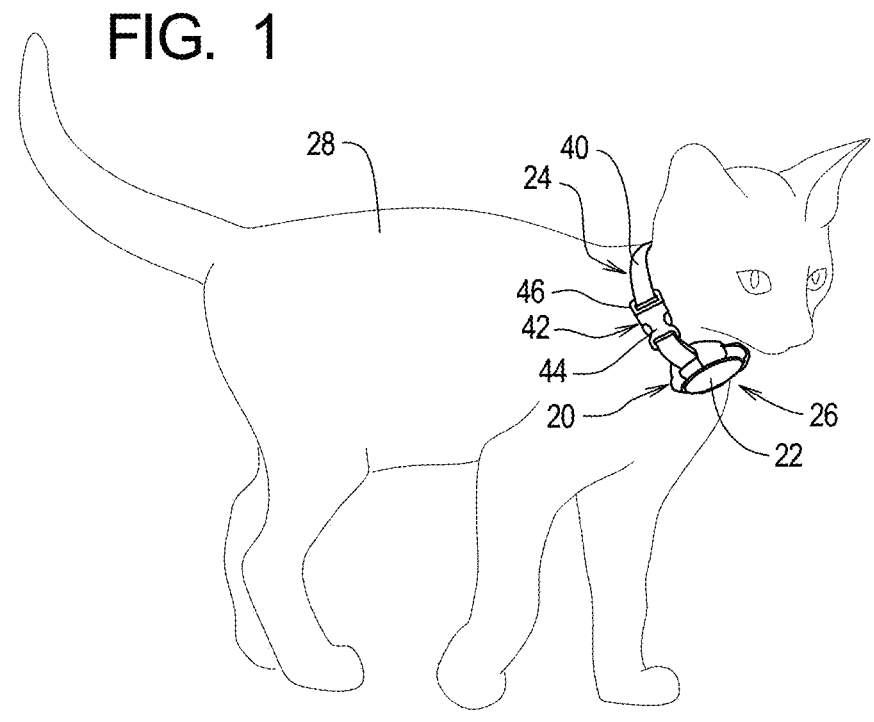
FIG. 2
FIG. 3
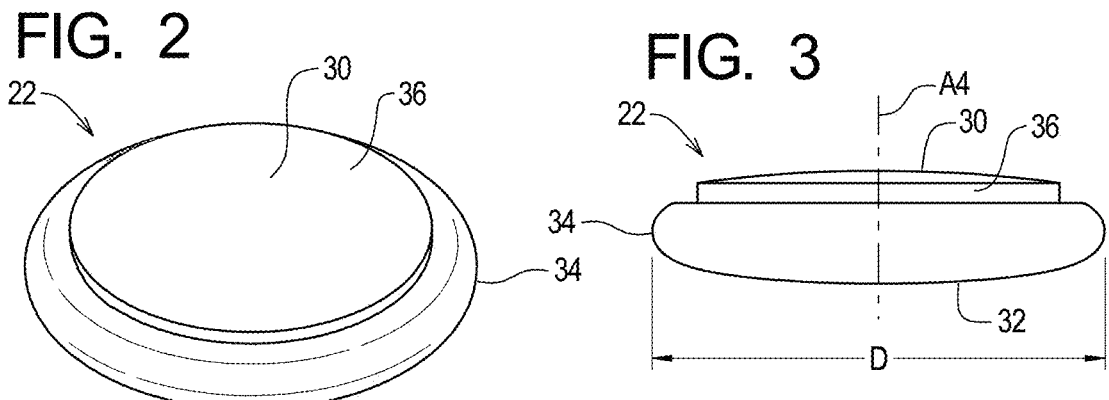
FIG. 4
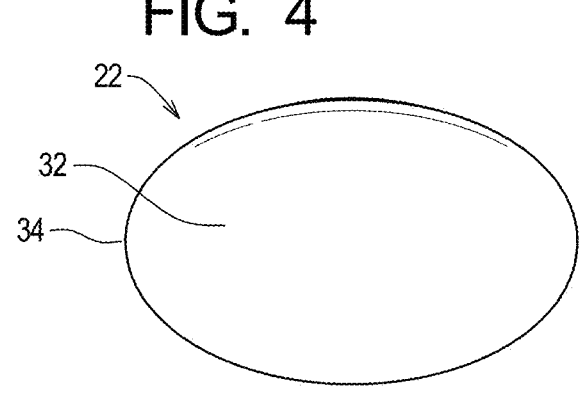

CLIP FOR SECURING A LOCATING DEVICE TO A STRAP

RELATED APPLICATIONS

This application, U.S. patent application Ser. No. 18/492,971 filed Oct. 24, 2023, claims benefit of U.S. Provisional Application Ser. No. 63/381,275 filed Oct. 27, 2022, the contents of which are incorporated herein by reference.

TECHNICAL FIELD

This application relates to systems and methods for monitoring the location of movable items and, in particular, to clips, systems, and methods for securing a locating device to an item such as a collar supported by a small animal.

BACKGROUND

Location devices that can be physically associated with a movable item to allow the locating of the movable item are well known. The present invention is of particular significance when used to secure an Apple AirTag® location device to the collar of a small animal such as a cat, and that application of the present invention will be described in detail herein. However, the principles of the present invention may be applied to other locating devices and to items in addition to animal collars. The scope of the present invention shall thus be determined by the claims appended hereto and not the following detailed description of the invention.

Locating devices are commonly used to locate items that are easily lost or stolen, such as purses or backpacks. However, a locating device can be associated with almost any item that needs to be located.

One common use of locating devices is to locate an animal by securing the locating device to an item, such as a collar, worn by the animal. The locating device itself is typically not configured to be directly attached to an item, and an attachment system is typically used to secure the locating device to the collar of the animal. Locating devices are relatively small and lightweight, but the effective bulk and weight of the locating device is typically increased somewhat by the attachment system. When secured to the collar of larger animals (e.g., at least 5 lbs. but typically more than 20 lbs.) using common attachment systems, the size and weight of the locating device and associated attachment system is typically negligible. However, for smaller animals (e.g., under 15 lbs.) such as cats (4-15 lbs.) and especially kittens (4-5 lbs.), toy dogs, and the like, the weight and the bulk of the locating device and associated attachment system becomes much more significant.

The need thus exists for improved attachment systems and methods for securing a locating device to an item, such as a strap or collar, associated with a relatively small item, such as an animal, purse, backpack, or the like, to be located.

SUMMARY

The present invention may be embodied as a clip for securing a locating device relative to an item. The clip comprises a base portion, a plurality of claw portions, and an attachment chamber. The plurality of claw portions extend from the base portion. The attachment chamber defines a first portion and a second portion. The first portion of the attachment chamber is sized and dimensioned to receive at least a portion of the locating device. The second portion of the attachment chamber is sized and dimensioned to receive at least a portion of the item. The claw portions are sized and dimensioned to secure the locating device within the first portion of the attachment chamber to inhibit movement of the locating device and the item relative to the clip.

The present invention may also be embodied as a method of securing a locating device relative to an item comprising the following steps. A clip is provided. The clip comprises a base portion, a plurality of claw portions extending from the base portion, and an attachment chamber defining a first portion and a second portion. The item is arranged within the second portion of the attachment chamber. The locating device is arranged within the first portion of the attachment chamber. The plurality of claw portions secure the locating device within the first portion of the attachment chamber to inhibit movement of the locating device relative to the clip. The locating device secured within the first portion of the attachment chamber inhibits movement of the clip relative to the item.

The present invention may also be embodied as a locating system comprising an item, a locating device, and a clip. The clip comprises a base portion, a plurality of claw portions extending from the base portion, and an attachment chamber defining a first portion and a second portion. At least a portion of the locating device is arranged within the first portion of the attachment chamber. At least a portion of the item is arranged within the second portion of the attachment chamber. With the locating device arranged within the first portion of the attachment chamber, the claw portions engage the locating device to inhibit movement of the locating device relative to the clip. With the item arranged within the second portion of the attachment chamber, the locating device engages the item to inhibit movement of the item relative to the clip.

BRIEF DESCRIPTION OF THE DRAWINGS

FIG. 1 is a perspective view of a first example location monitoring system secured to a cat;

FIG. 2 is a perspective view of a first side of a first example locating device forming part of the first example location monitoring system;

FIG. 3 is an edge elevation view of the first example locating device;

FIG. 4 is a perspective view of a second side of the first example locating device;

DETAILED DESCRIPTION

Figures 5, 6:
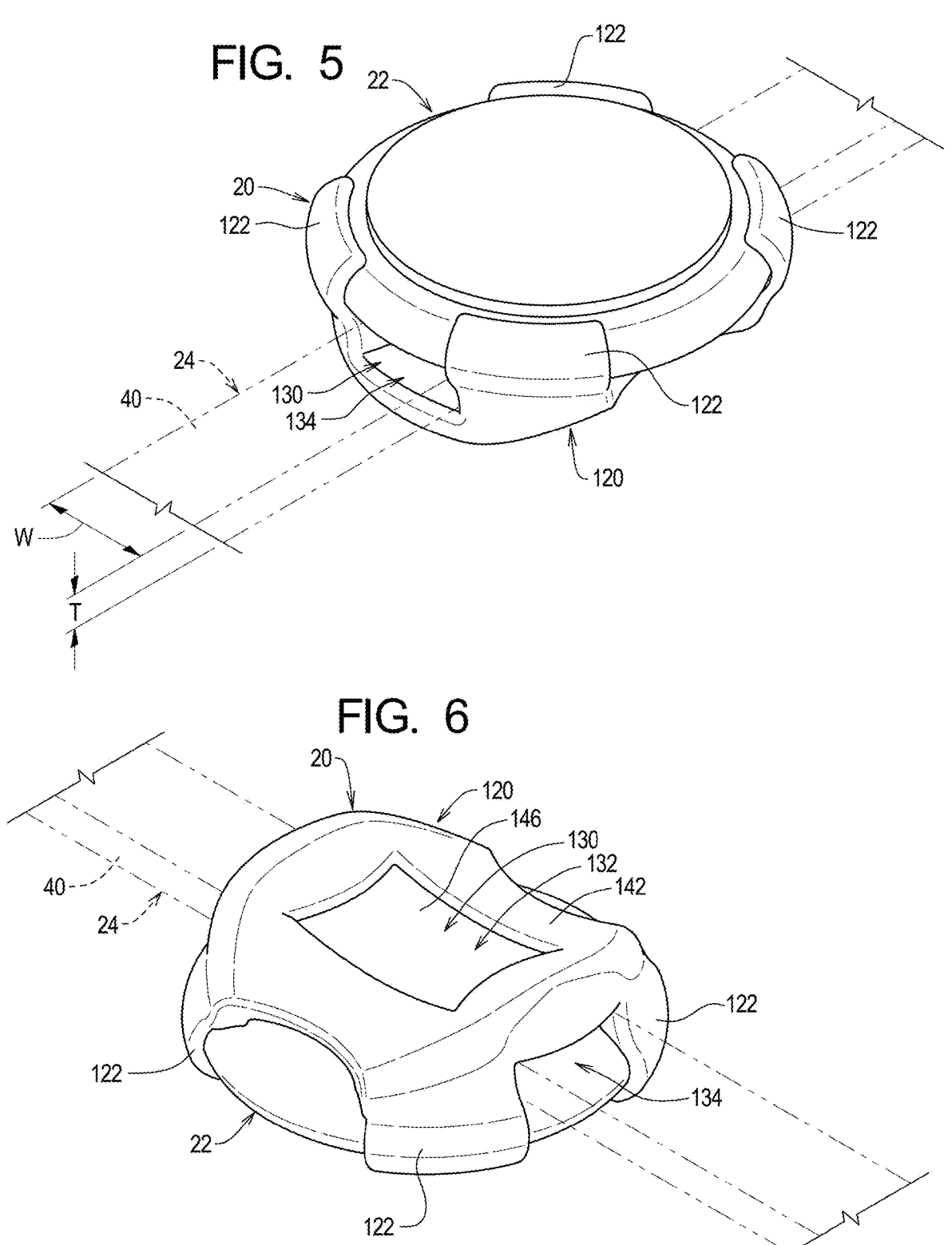
FIG. 5 is a first perspective view of a portion of the first example location monitoring system.
FIG. 6 is a second perspective view of a portion of the first example location monitoring system.

FIG. 1 of the drawing depicts an example clip 20 used to attach a locating device 22 to a collar assembly 24 to form an example locating system 26. The example locating system 26 is shown being used to secure the locating device 22 relative to a small animal 28. In FIG. 1, the small animal 28 is a kitten, and the locating system 26 allows the location of the kitten 28 to be determined using the locating device 22.

As shown in FIGS. 2-4, the example locating device 22 defines a first side 30, a second side 32, and a perimeter edge 34. The first side 30 comprises a disc-shaped protrusion 36 as shown in FIG. 2, and the second side 32 is smooth continuously curved shape that is substantially ovoid in cross-section as shown in FIGS. 3 and 4. The perimeter edge 34 is in the shape of a closed circle. The example collar assembly 24 comprises a strap member 40 and a buckle assembly 42 comprising a first buckle portion 44 and a second buckle portion 46. The example locating device 22 and the example collar assembly 24 are or may be conventional and will be described herein only to that extent helpful to a complete understanding of the present invention.

As shown in FIGS. 5-8, the example clip 20 comprises a base portion 120 and a plurality (two or more) of claw portions 122 configured to define an attachment chamber 130 defining a device portion 132 and a strap portion 134. The example device portion 132 is sized and dimensioned to receive the locating device 22, and the strap portion 134 is sized and dimensioned to receive a portion of the collar assembly 24. The example clip 20 is configured to be combined with the locating device 22 such that the combination of the clip 20 and the locating device 22 encircles a portion of the strap member 40 to secure a position of the locating device 22 relative to the collar assembly 24. The buckle assembly 42 is then used to secure the collar assembly relative to the kitten 28.

The construction of the example clip 20 and the use of the example clip 20 to form the locating system 26 will now be described in further detail.

The example clip 20 defines an clip longitudinal axis A1, and clip lateral axis A2, and an clip center axis A3. The example locating device 22 defines a device center axis A4 and a device diameter D (FIG. 3). The example strap member 40 defines a strap width W and a strap thickness T. In the following discussion, a letter suffix appended to a numerical reference character refers to a particular instance of the element associated with the numerical reference character and is not different from the element associated with the numerical reference character.

Figure 16:
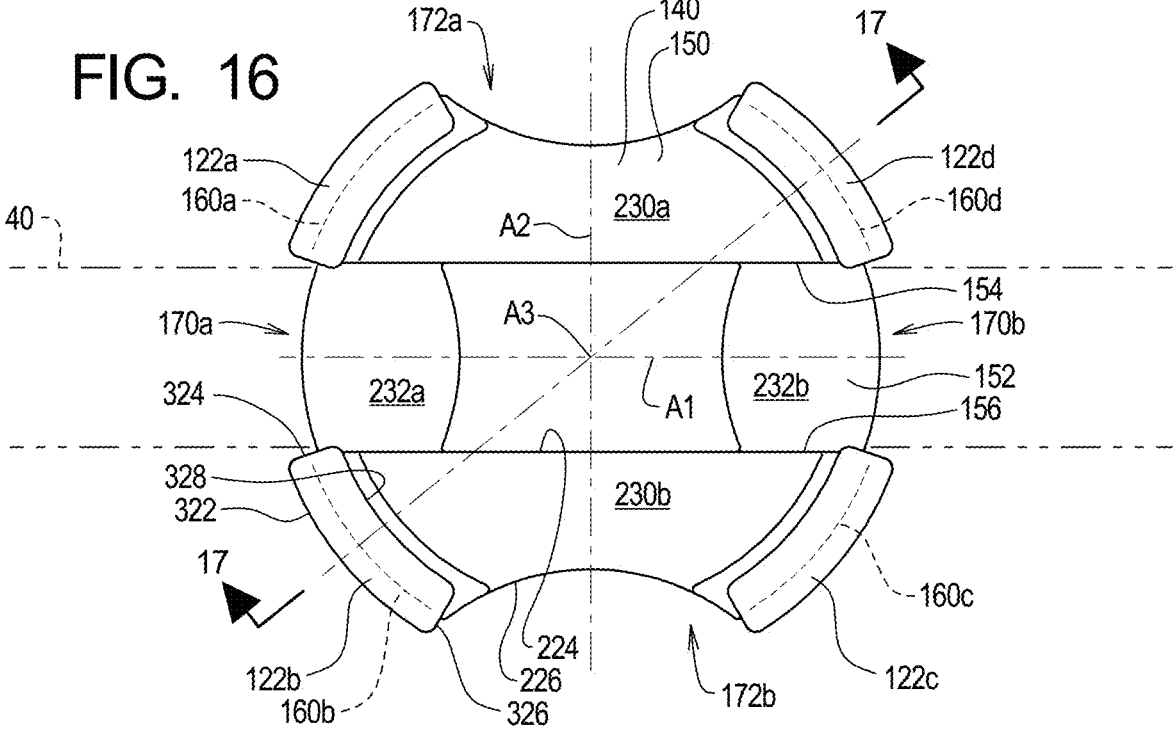
FIG. 16 first plan view of the first example clip illustrating the first reference plane, the second reference plane, and a third reference plane extending at an angle to the first and second reference planes.

The example base portion 120 defines a first surface 140 (FIGS. 12 and 16), a second surface 142 (FIGS. 6 and 11), a perimeter edge 144 (FIGS. 11 and 12), and a base opening 146 (FIGS. 6, 8, 12, and 19). The example first surface 140 defines a device facing surface portion 150, a collar facing surface portion 152, and first and second collar side surface portions 154 and 156.

Figure 13:
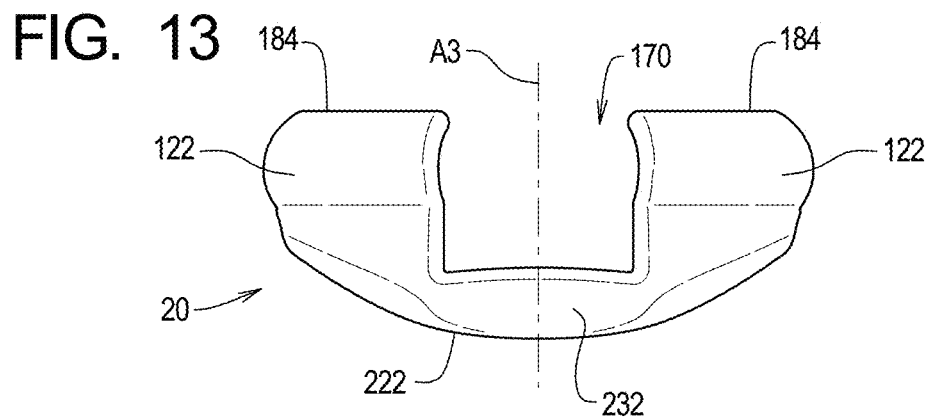
FIG. 13 is an edge elevation view of bridge portions of the first example clip.
Figure 14:
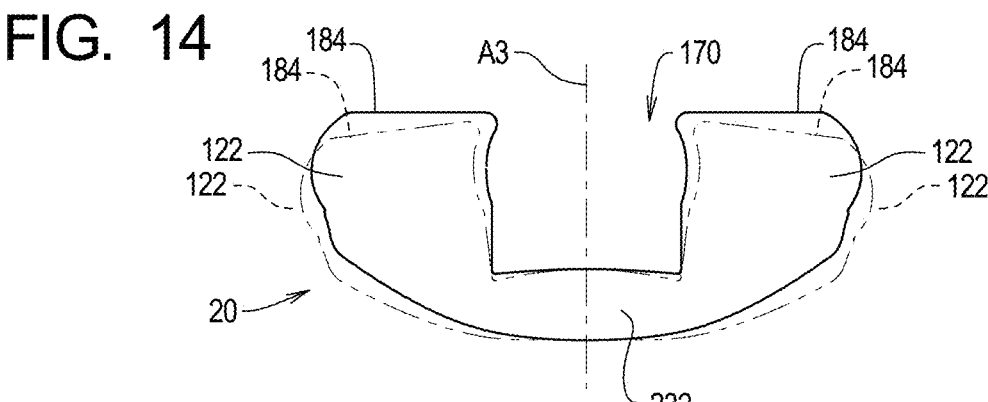
FIG. 14 is an edge elevation view similar to that of FIG. 13 with broken lines illustrating deformation of bridge portions of the first example clip relative to a first reference plane.
Figure 15:
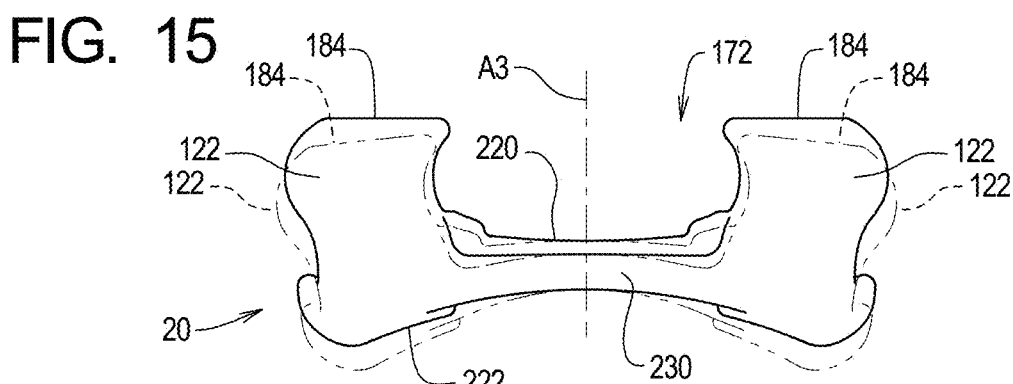
FIG. 15 is an edge elevation view with broken lines illustrating deformation of bridge portions of the first example clip relative to a second reference plane, the second reference plane being orthogonal to the first reference plane.

The example device facing surface portion 150 is sized and dimensioned to accommodate either of the first and second sides 30 and 32 of the locating device 22. The example collar facing surface portion 152 is offset from the device facing surface portion 150 a distance greater than the thickness T of the strap member 40 and is sized and dimensioned such that the first and second collar side surface portions 154 and 156 are spaced from each other a distance wider than the width W of the strap member 40. The example second surface 142 is continuously curved in two dimensions to generally conform to the neck and chin of the example kitten 28. In particular, FIGS. 13 and 14 illustrate that the second surface 146 is concave in cross-section, while FIG. 15 illustrates that the second surface 146 is also convex in cross-section. The example perimeter edge 144 comprises a plurality of perimeter edge portions 160. The example base portion 120 further defines a plurality of longitudinal gaps 170 and a plurality of lateral gaps 172.

The example claw portions 122 are spaced from each other a distance defined by the device diameter D of the locating device 22. Each of the claw portions 122 defines a proximal portion 180, a distal portion 182, and a tip portion 184. Each proximal portion 180 is connected to the base portion 120, and each distal portion 182 is arranged between the proximal portion 180 and the tip portion 184. As perhaps best shown in FIG. 17, the example claw portions 122 are curved from the proximal portion 180, through the distal portion 182, and to the tip portion 184 such that the distal portion 182 at least indirectly faces the proximal portion 180. Accordingly, when the locating device 22 is within the device portion 132 of the attachment chamber 130, the proximal portion 180 faces towards one of the first and second sides 30 and 32 of the locating device and the distal portion 182 faces towards the other of the first and second sides of the locating device 22. The distal portions 182 of the claw portions 122 thus retain the locating device 22 within the device portion 132 of the attachment chamber 130 to inhibit movement of the locating device 22 out of the device portion 132 of the attachment chamber 130 during use of the clip 20 to form the locating system 26.

The example clip 20 comprises first, second, third, and fourth claw portions 122a, 122b, 122c, and 122d associated with first, second, third, and fourth perimeter edge portions 160a, 160b, 160c, and 160d. A first longitudinal gap 170a is arranged between the first and fourth perimeter edge portions 160a and 160d, and a second longitudinal gap 170b is arranged between the second and third perimeter edge portions 160b and 160c. A first lateral gap 172a is arranged between the first and second perimeter edge portions 160a and 160b, and a second lateral gap 172b is arranged between the third and fourth perimeter edge portions 160c and 160d. The first and second longitudinal gaps 170a and 170b extend parallel to the device member longitudinal axis A1 and through the strap portion 134 of the attachment chamber 130, and first and second lateral gaps 172a and 172b extend parallel to the clip lateral axis A2 and through the device portion 132 of the attachment chamber 130.

The example base portion 120 defines an inner base surface 220, an outer base surface 222, an inner base edge 224, and an outer base edge 226. The example base portion 120 further defines at least one longitudinal bridge portion 230 and at least one lateral bridge portion 232.

Each of the claw portions 20 defines a claw inner surface 320, a claw outer surface 322, a claw first side edge 324, a claw second side edge 326, and a claw distal edge 328. Each claw inner surface 320 defines a claw inner surface extension portion 340 and a claw inner surface retaining portion 342. Each claw outer surface 322 defines a claw outer surface extension portion 350 and a claw outer surface retaining portion 352. Each claw distal edge 328 defines the tip portion 184 of one of the claw portions 122.

The inner base surface 220 is sized and configured to allow the locating device 22 to be received within the device portion 132 of the attachment chamber 130. The outer base surface 222 is sized and configured to be smooth, or without any edges or discontinuities, to reduce friction, abrasion, or other action that may irritate the kitten 28 wearing the locating system 26. The example outer base surface 222 is concave in the direction of the attachment center longitudinal axis A1 (e.g., FIGS. 9, 11, and 15) and convex in the direction of the clip lateral axis A2 (e.g., FIGS. 10 and 13). The shape of the outer base surface 222 thus generally corresponds to the shape of the neck of the animal 28 wearing the collar assembly 24. The lateral bridge portions 232 are offset from the longitudinal bridge portions 230 to define the strap portion 134 of the attachment chamber 120. All edges between surface portions of the outer base surface 222 are beveled or rounded.

Figure 7:
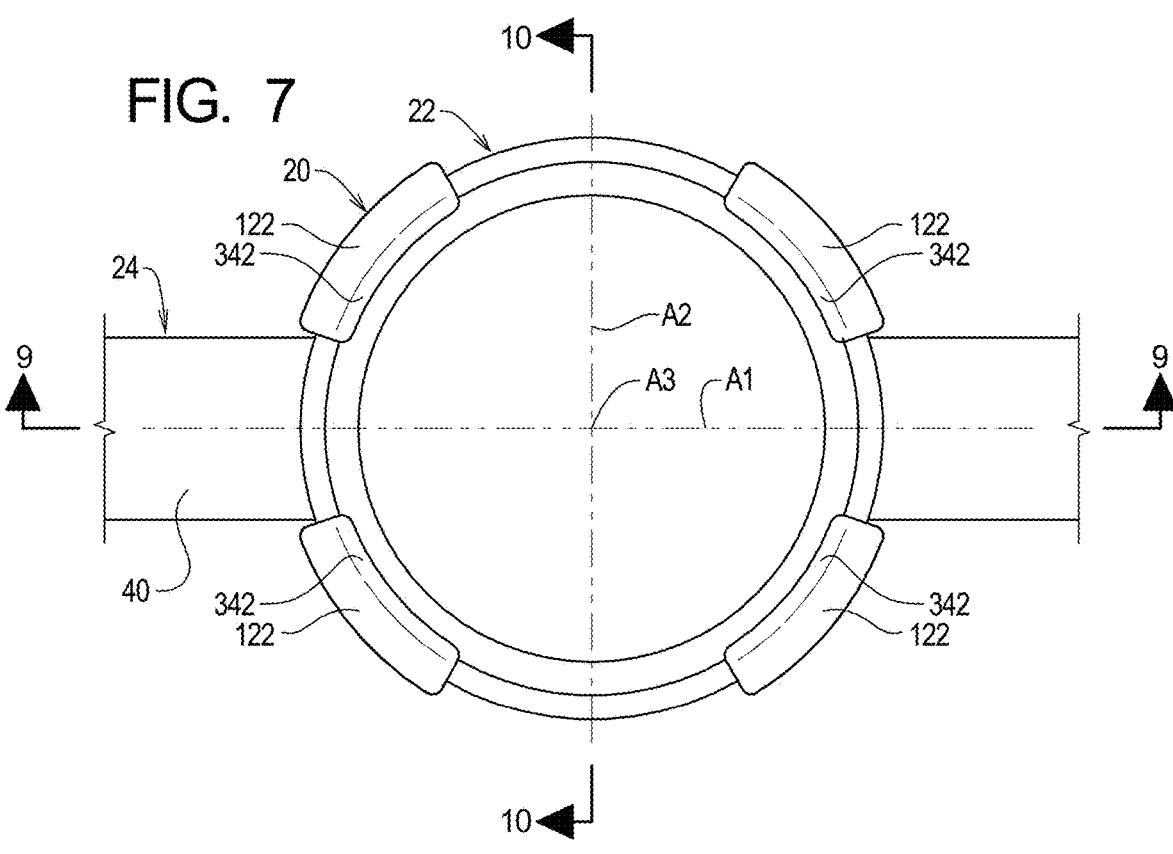
FIG. 7 is a first plan view of a portion of the first example location monitoring system.
Figure 8:
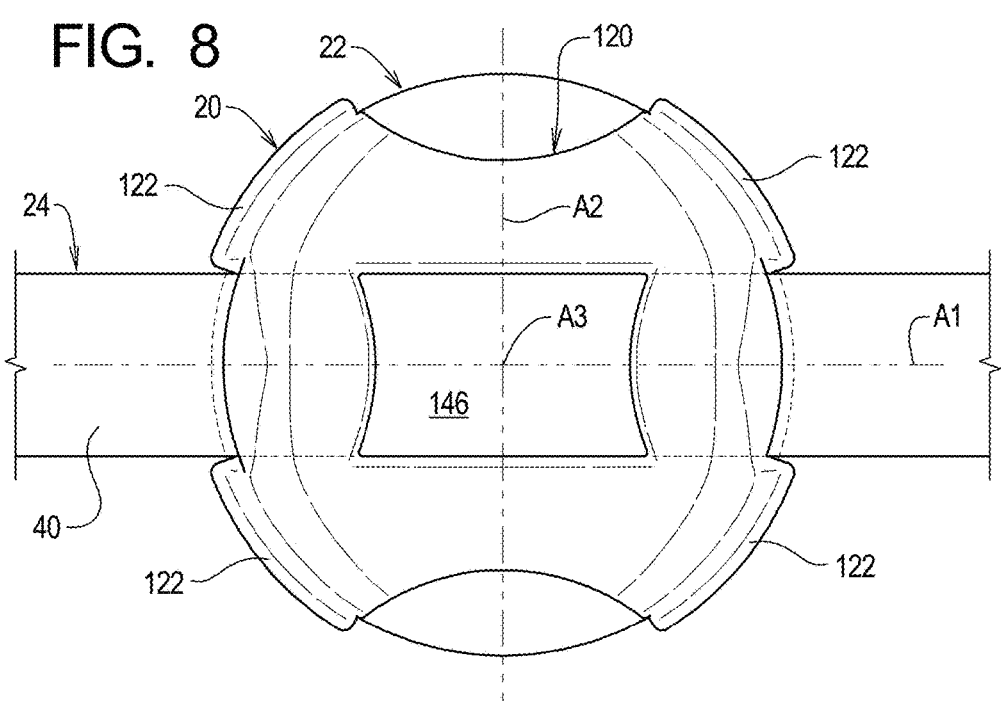
FIG. 8 is a second plan view of a portion of the first example location monitoring system.
Figure 9:
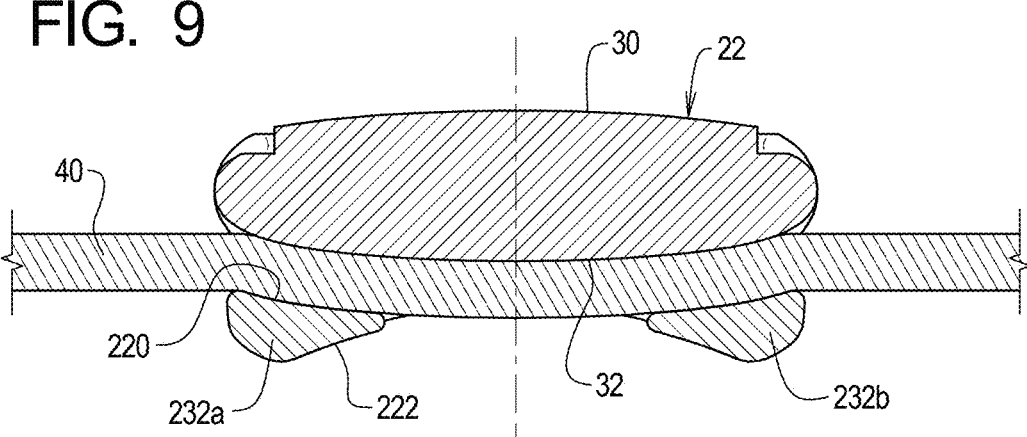
FIG. 9 is a section view taken along lines 9-9 in FIG. 7.
Figure 10:
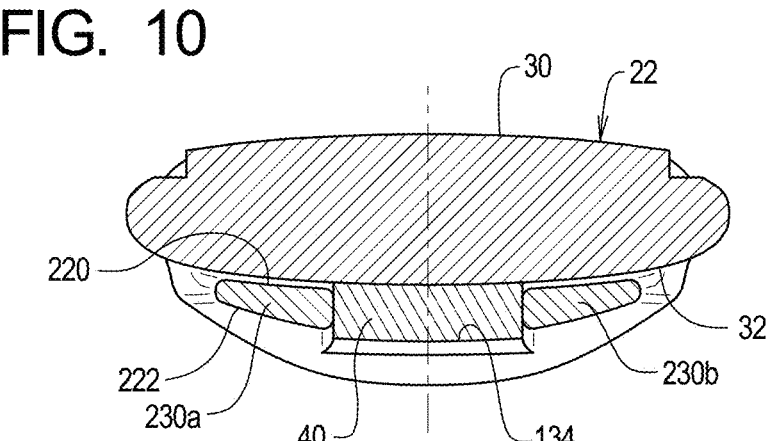
FIG. 10 is a section view taken along lines 10-10 in FIG. 7.

With the strap member 40 arranged within the strap portion 134 and the locating device 22 supported within the device portion 132 as shown in FIGS. 9 and 10, a portion of the strap member 40 is held between the lateral bridge portions 232 and the locating device 22 as shown in FIG. 9. Further, FIGS. 5 and 7 illustrate that, when the locating device 22 is within the device portion 132, the claw inner surface retaining portions 342 of the claw portions 122 engage the locating device 22 to inhibit inadvertent removal of the locating device 22 from the device portion 132 of the attachment chamber 120.

Figure 11:
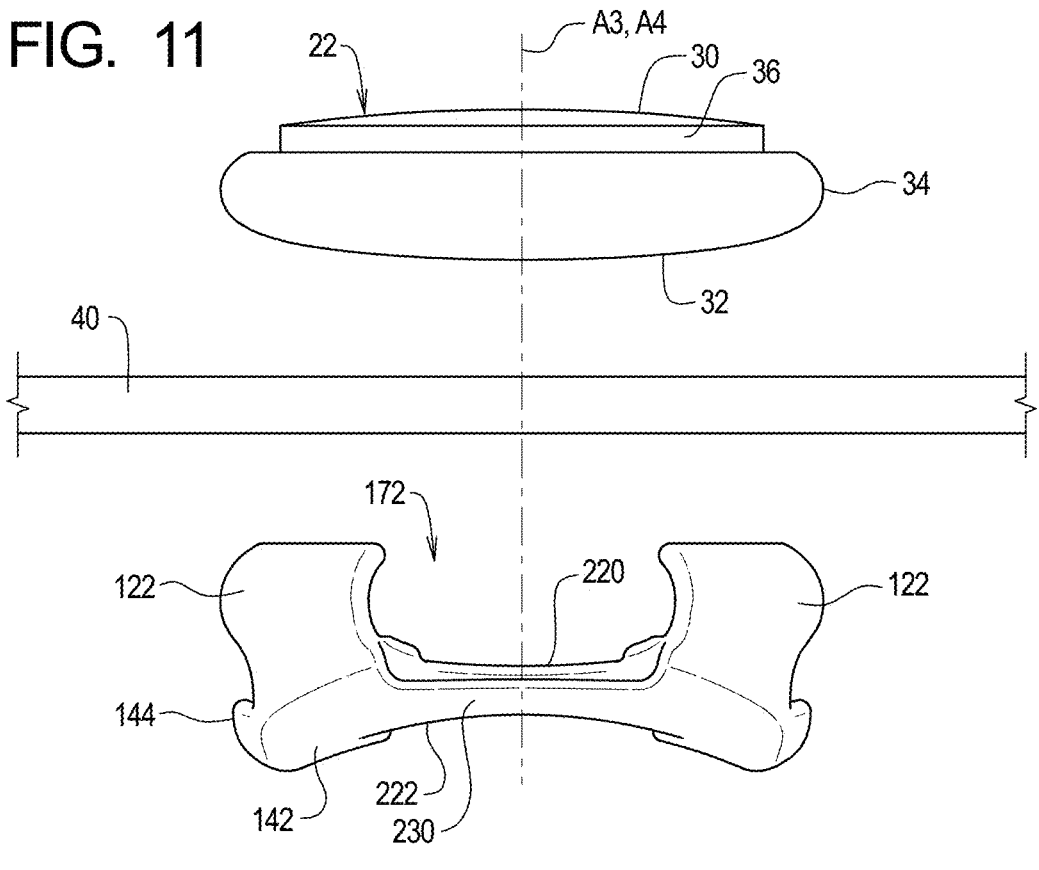
FIG. 11 is an edge elevation exploded view of a portion of the first example location monitoring system.
Figure 12:
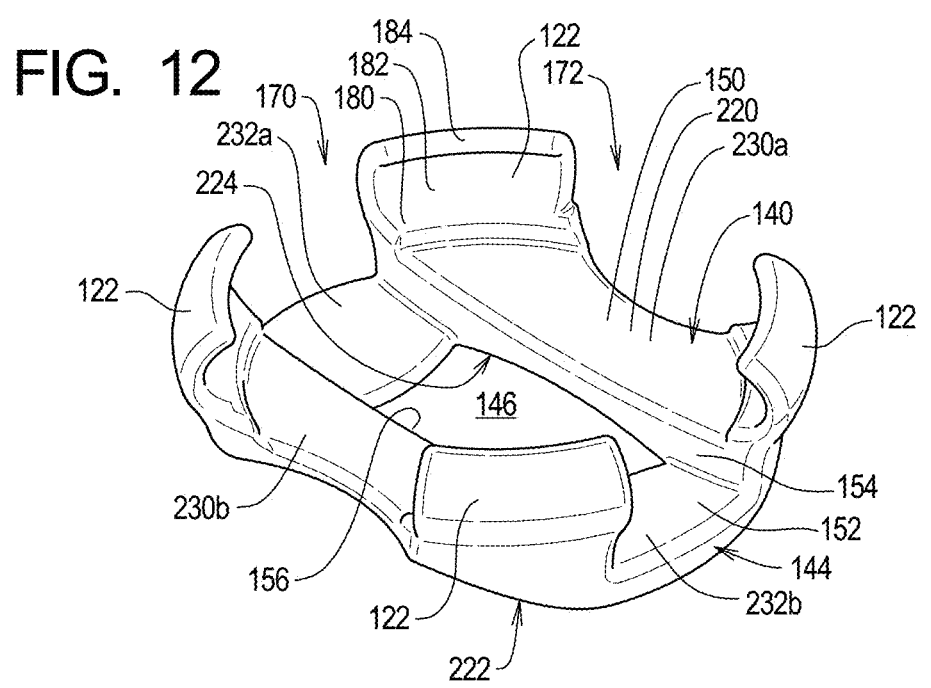
FIG. 12 is a perspective view of a first example clip forming a part of the first example location monitoring system.
Figure 17:
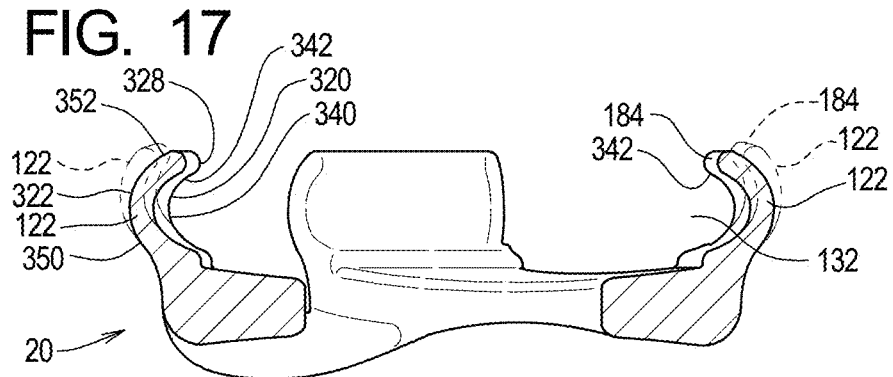
FIG. 17 is an edge elevation section view taken along lines 17-17 in FIG. 16 with broken lines illustrating deformation of claw portions of the first example clip relative to the third reference plane.
Figure 18:
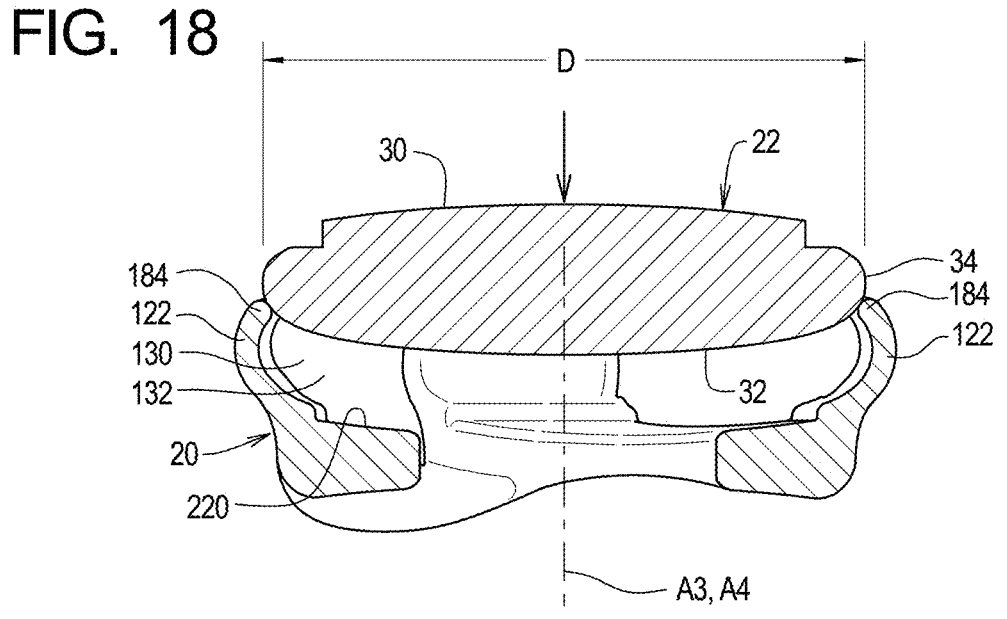
FIG. 18 is an edge elevation section view similar to FIG. 17 illustrating assembly of the first example locating device with the first example clip.

To arrange the locating device 22 within the device portion 132 of the attachment chamber 120, the device center axis A4 is substantially aligned with the clip center axis A3 with the clip 20 in its original configuration (e.g., FIGS. 11 and 18). Then, manual force is deliberately applied to one of the first and second sides 30 and 32 of the locating device 22 such that the perimeter edge 34 of the locating device 22 applies an outward force to the tip portions 184 of the claw portions 122. The outward force on the tip portions 184 reconfigures the clip 20 into a deformed configuration (FIGS. 14, 15, 17) such that the tip portions 184 of the claw portions 122 are sufficiently spread apart to allow the locating device 22 to be displaced into the device portion 132 of the attachment chamber 130. After the locating device 22 clears the tip portions 184 of opposing claw portions 122 and is within the device portion 132, the clip 20 resiliently returns to the original configuration such that the claw surface inner retaining portion(s) 342 hold the locating device within the device portion 132 of the attachment chamber 130.

After the clip 20 has been attached to the locating device 22, subsequent inadvertent removal of the locating device 22 from the clip 20 is and should be difficult. When the locating device 22 is secured by the clip 20 to an animal such as the kitten 28, normal activities of the kitten 28 (e.g., playing, walking in communal spaces, and/or fighting), may result in the locating device 22 being subjected to external forces (e.g., scratched, rubbed, pulled, and/or pushed) that could dislodge the locating device 22 from the clip 20 thereby separating the locating device 22 from the kitten 28. Other devices to be located, such as bags, purses, backpacks, camera cases, luggage, and the like, will similarly be subjected to external forces that could dislodge the locating device 22 from the clip 20 and thus separate the locating device 22 from the device to be located. Accordingly, while the locating device 22 is designed to be removed from the clip 20, the clip 20 is designed such that this removal is achieved only through highly specific deliberate application of manual force to the locating device 22 that is unlikely to be applied during normal use of the clip 20 to secure the locating device 22 relative to the item or animal to be located.

Figure 19:
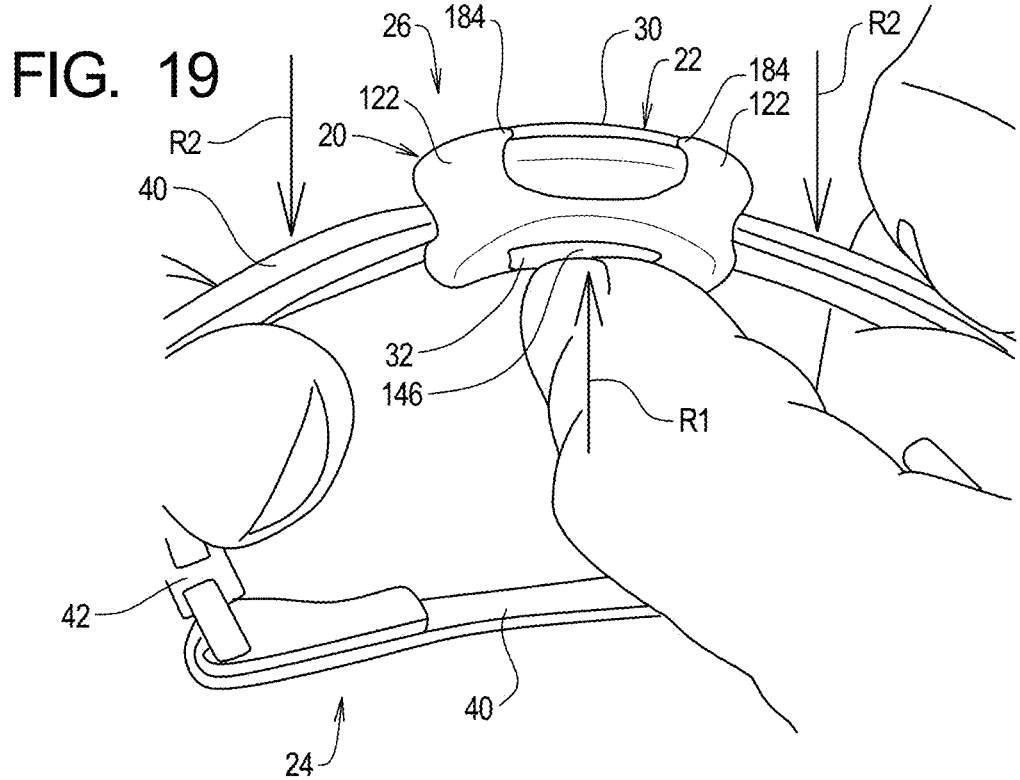
FIG. 19 is an edge view illustrating removal of the first example locating device from the first example clip to disassemble the first example location monitoring system.
Figures 20, 21, 22:
FIGS. 20, 21, and 22 are photographs of a kitten wearing an example locating system 26 of the present invention.

To remove the locating device 22 from the device portion 132 of the attachment chamber 130, as perhaps best shown in FIG. 19 manual force may be deliberately applied to one of the first and second sides 30 and 32 of the locating device 22 through the base opening 146 as shown by arrow R1 while holding the strap member 40 on either side of the locating system 26 and pulling both sides of the strap member 40 back in a direction shown by arrows R2 (substantially opposite direction as arrow R1). The manual force on the locating device 22 in the direction shown by arrow R1 while simultaneously pulling the portions of the strap member 40 on either side of the clip 20 as shown by the directions of arrows R2 causes the perimeter edge 34 of the locating device 22 to apply an outward force to the tip portions 184 of the claw portions 122 sufficient to force the clip 20 from the undeformed configuration into the deformed configuration. With the manual force applied to the locating device 22 and the clip 20 in the deformed configuration, the spacing between opposing tip portions 184 becomes at least substantially equal to the device diameter D such that the locating device 22 is allowed to move out of its retained position relative to the device portion 132 of the clip 20. After the locating device 22 is removed from the device portion 132, the clip 20 returns to the undeformed configuration.

As generally discussed above, outward forces applied to the tip portions of the claw portions 122 when the locating device 22 is inserted into or removed from the device portion 132 of the attachment chamber 130 deform the clip 20 as shown in FIGS. 14, 15, and 17. To allow this deformation, the example clip 20 is thus made of a material that is sufficiently resiliently deformable to allow the longitudinal bridge portion(s) 230 (FIG. 15), the lateral bridge portions 232 (FIG. 14), and the claw portions 122 (FIG. 17) to deform sufficiently to allow the locating device 22 to be displaced along the clip center axis A3 into or out of the device portion 132 of the attachment chamber 130. Examples of suitable materials include polymers (e.g., plastics), metal, and wood. The example clip 20 is injection molded from plastic. If a polymer material is used, the selected polymer should crystallize quickly so that it can eject faster, more accurately, and more economically from a low cost mold. The selected polymer should be low-cost and easy to procure but have as much strength as possible to better achieve the structural design goals of the clip as generally described herein. The selected polymer should not be mechanically affected by environmental factors such as the (hydrophilic) tendency to absorb or otherwise take in water. One primary factor to be considered when selecting a polymer formulation is flexural modulus. The flexural modulus should be as high as practical (e.g., around 2600 MPa (MegaPascals, test method ISO 178)). The selected polymer should minimize the emission of toxic fumes during manufacture and use. Certain polymers may be modified with one or more additives to attain the right color and/or enhance resistance to deterioration due to UV light. The following injection moldable materials provide an acceptable to optimal blend of strength, resiliency, flexibility, and aesthetics: Dupont Delrin "500", Kocetal K300 "Acetal", Polycarbonate, Sabic Extem XH, Nylon, and/or Polyester.

The strap member 40 is typically a length of conventional webbing material, and the strap width W thereof for a collar assembly 24 appropriate for a small animal such as the kitten 28 is typically ⅜", but strap widths of ½", ⅝", and ¾" are common, and the example clip 20 may be configured to accommodate other widths, including metric widths.

The distance between the first and second collar side surface portions 154 and 156 should be large enough to allow the strap member 40 to be arranged flat within the strap portion 134 of the attachment chamber 130. Accordingly, a distance or dimension of the device portion 132 of the attachment chamber 130 along the clip center axis A3 (e.g., between the device facing surface portion(s) 150 and the collar facing surface portion 152) should be large enough to allow the strap member 40 to be arranged completely within the strap portion 134. In particular, the strap portion 134 should be sized and dimensioned such that, with the strap member 40 within the strap portion 134 and the locating device 22 within the device portion 132. While a thicker strap portion 134 may frictionally engage the example clip 20 and/or locating device 22 to inhibit movement of the clip 20 relative to the strap portion 134, a thinner strap portion 134 may allow movement of the clip 20 along the clip lateral axis A2 relative to the strap member 40 during normal use. Such movement is acceptable during normal use of the clip 20 and locating device by the kitten 28.

To summarize, the example locating system 26 is formed by first arranging a portion of the strap member 40 within the strap portion 134 of the attachment chamber 130. The locating device 22 is next forced into the device portion 132 of the attachment chamber 130. At this point, the claw portions 122 engage and hold the locating device 22 within device portion 132 of the attachment chamber 130, and the locating device 22 holds a portion of the strap member 40 within the strap portion 134 of the attachment chamber 130. With the strap portion 134 appropriately sized, dimensioned, and configured, the strap member 40 is securely held within the strap portion 134 of the attachment chamber 130 such that movement of the clip 20 and locating device 22 relative to the collar assembly 24 is substantially inhibited during normal wearing of the locating system 26 by the animal 28. The collar assembly 24 is then used in a conventional manner to secure the locating system 26 relative to the animal 28.

To disassemble the locating system 26, the locating device 22 is forced out of the device portion 132 of the attachment chamber 130 as described above with respect to FIG. 19. The strap member 40 is then removed from the strap portion 134 of the attachment chamber 130 to complete the disassembly of the locating system 26.

The example locating device 22 is capable of generating sound to facilitate the location of the animal 28. The speaker (not visible) is arranged on the second side 32 of the locating device 22 (i.e., opposite the disc-shaped protrusion 36). The clip 20 is configured to allow the locating device 32 to be arranged with either the first side 30 or the second side 32 facing the animal 28. With the speaker of the second side 32 facing the animal 28, the sound will be attenuated by around 10-15 decibels. With the speaker of the second side 32 facing away from the animal 28, the sound will be direct or unattenuated. The user may thus choose whether or not to attenuate the speaker by choosing which of the first and second sides 30 or 32 of the locating device 22 faces the animal 28. Muffling, or attenuating, the sound may reduce the likelihood that the animal 28 will be startled by sounds generated by the locating device 22 given that ears of the animal 28 might only 1-2 inches away from the locating device 22. However, not attenuating the sound may assist in locating of the animal 28.

The clip 20 contains only sufficient material to secure the locating device to the collar assembly 24 as described herein. The size, shape, and configuration of the clip 20 thus minimizes weight of the locating system 26, making the locating system 26 appropriate for even small animals 28 like kittens.

Although the example clip 20 of the present invention has been described herein in the context of a strap member 40 forming part of a collar assembly 24 for a cat 28, the example clip 20 may be used to attach the locating device 22 to elongate members having a similar physical structure as the example strap member 40. For example, purses, backpacks, camera bags, and other common items typically contain straps with a width and depth similar to the example strap member 40. The example clip 20 of the present invention may be used to securely attach the example locating device 22 to straps of such other common items.

The following Table A lists certain features and associated benefits of the example clip 20 that are not found, alone or in combination, in conventional attachment systems designed to secure a locating device 22 to an item to be located.

| FEATURE | BENEFIT |
|---|---|
| Outer base surface 222 of the clip 20 is concave in first plane and convex in second plane orthogonal to first plane (e.g., FIGS. 9 and 10) | The shape of the base surface 222 is configured to fit the shape of the cat's neck so that the clip 20 fits more comfortably and tighter against the cat's neck. This shape of the clip 20 also allows the locating device 22 to ride closer to cat so the locating device 22 is less likely to catch on corners, plants, and the like during use. |
| The clip 20 is configured to minimize material usage and thus minimizes weight and bulk. | An Apple AirTag ® weighs approximately 11 grams. The example clip 22 weighs approximately 2 grams. The combination of the clip 20 with the locating device 22 is thus only marginally heavier than the locating device 22 itself, thereby minimizing |

-continued

| FEATURE | BENEFIT |
| --- | --- |
| | discomfort to the entity carrying the combination. The shape of the clip 22 further minimizes use of plastic, which reduces cost. Reduction in material used further allows the use of better, perhaps more expensive, polymer choices. |
| The clip 20 does not enclose the locating device 22 and thus the combination of the clip and 22 is only marginally larger than the locating device 22 itself. | The locating device 22 is visible when combined with the clip 20. Further, an Apple AirTag ® is waterproof and does not require enclosure. As such, the overall circumference of the combination of the clip 20 and locating device 22 is approximately the same as the locating device 22 itself. In a thickness direction, the clip 20 only marginally adds to the thickness of the locating device 22 and strap member 40. |
| The example clip 20 exhibits both reduced weight and reduced bulk. | The example clip 20 is more comfortable, especially in the context of a small animal such as a kitten. |
| The structure of the example clip 20 allows a much smaller animal to be accommodated with reduced discomfort. | While the example clip 20 has advantages even when used with a larger animal, the structure of the example clip 20 allows even very small animals to be located using a locating device 22. |
| The example clip 20 engages the strap member 40 at two spaced locations instead of a single center location. | The example clip 20 allows more refined and secure arrangement of the locating device 22 along the strap member 24, thereby allowing control of the location of the locating device 22 relative to the animal 28. |
| The structure of the example clip 20 allows mass production with minimal use of plastic resin beads. | The example clip 20 can be manufactured economically at high volume with commonly available materials. |
| The structure of the example clip 20 does not require a rubbery, high friction material and instead allows use of smooth, low-friction, hard plastics. | The use of hard plastic means that the clip 20 is less likely to pull or catch on the fur of the animal 28 and also is less likely to catch on surrounding objects. |
| The low weight and bulk of the example clip 20 allows the locating device 22 to be secured to smaller animals. | The example clip 20 effectively extends the use of the locating device 22 to small, vulnerable animals 28, such as kittens, that most need locating. |
| The example clip 20 securely attaches the locating device 22 to the strap member 40 but may be easily be removed by owner when desired using the innovative removal method as depicted in FIG. 19. | Conventional locating device clips compromise loss of locating device in favor of ease of removal by the owner. |
| The surface 150 shaped to accommodate either side 30 or 32 of the locating device 22 | Can be either loud sound or muted sound based on configuration of locating device 22 within clip chamber 130 |

What is claimed is:

1. A clip for securing a locating device relative to an item comprising:

a base portion;

a plurality of claw portions, where each of the plurality of claw portions extends from the base portion; and an attachment chamber defining a first portion and a second portion; wherein the first portion of the attachment chamber is sized and dimensioned to receive at least a portion of the locating device;

the second portion of the attachment chamber is sized and dimensioned to receive at least a portion of the item;

the claw portions are sized, dimensioned, and supported by the base portion such that at least two of the plurality of claw portions are spaced from each other to define at least one longitudinal gap, and the at least one longitudinal gap is not enclosed by the at least two of the plurality of claw portions defining the at least one longitudinal gap;

the at least one longitudinal gap is sized and dimensioned such that the item may be displaced through the at least one longitudinal gap between the at least two claw portions;

the plurality of claw portions are spaced from the item when the item is arranged within the second portion of the attachment chamber, the claw portions are configured to engage the locating device when the locating device is arranged within the first portion of the attachment chamber, and with the item arranged within the second portion of the attachment chamber and the locating device within the first portion of the attachment chamber, the locating device is capable of engaging the item such that the item engages the base portion to inhibit movement of the locating device and the item relative to the clip.

2. A clip as recited in claim 1, in which at least one of the plurality of claw portions is resiliently deformable.

3. A clip as recited in claim 1, in which at least a portion of the base portion is resiliently deformable.

4. A clip as recited in claim 1, in which:

at least one of the plurality of claw portions is resiliently deformable; and at least a portion of the base portion is resiliently deformable.

5. A clip as recited in claim 1, in which the base portion comprises:

at least one longitudinal bridge portion; and at least one lateral bridge portion.

6. A clip as recited in claim 5, in which at least one of the at least one longitudinal bridge portion and the at least one lateral bridge portion is deformable.

7. A clip as recited in claim 6, in which at least one of the plurality of claw portions is resiliently deformable.

8. A clip as recited in claim 5, in which:

the at least one longitudinal bridge portion is resiliently deformable;

the at least one lateral bridge portion is resiliently deformable; and at least one of the plurality of claw portions is resiliently deformable.

9. A clip as recited in claim 1, in which at least one base opening is formed in the base portion.

10. A clip as recited in claim 1, in which:

each of the plurality of claw portions comprises a proximal portion connected to the base portion and a distal portion; and at least an inner surface of each of the example claw portions is curved from the proximal portion through the distal portion such that the distal portion at least indirectly faces the proximal portion.

11. A method of securing a locating device relative to an item comprising the steps of:

providing a clip comprising a base portion, at least one pair of claw portions extending from the base portion, an attachment chamber defining a first portion and a second portion, and a longitudinal gap extending between the at least one pair of claw portions, where the at least one pair of claw portions extends from the base portion such that at least two of the plurality of claw portions are spaced from each other to define the longitudinal gap, the longitudinal gap is sized and dimensioned such that the item may be displaced through the longitudinal gap between the at least two claw portions, and the longitudinal gap is not enclosed by the at least two of the plurality of claw portions defining the longitudinal gap;

arranging the item between the at least one pair of claw portions such that the item is displaced through the longitudinal gap and into the second portion of the attachment chamber; and with the item arranged within the second portion of the attachment chamber, arranging the locating device within the first portion of the attachment chamber;

configuring the at least one pair of claw portions to engage the locating device when the locating device is within the first portion of the attachment chamber such that the locating device engages the item and the item engages the base portion to inhibit movement of the locating device and the item relative to the clip.

12. A method as recited in claim 11, in which at least a portion of one of the claw portions is resiliently deformable.

13. A method as recited in claim 11, in which at least a portion of the base portion is resiliently deformable.

14. A method as recited in claim 11, in which the step of providing the clip comprises the step of forming the base portion to define:

at least one longitudinal bridge portion; and at least one lateral bridge portion.

15. A method as recited in claim 14, in which at least one of the at least one longitudinal bridge portion and the at least one lateral bridge portion is deformable.

16. A method as recited in claim 11, further comprising the steps of:

forming at least one base opening in the base portion; and applying pressure to the locating device through the item to remove the locating device from the first portion of the attachment chamber.

17. A locating system comprising:

an item;

a locating device;

a clip comprising a base portion, at least one pair of claw portions extending from the base portion, a longitudinal gap extending between the at least one pair of claw portions, and an attachment chamber defining a first portion and a second portion; wherein the at least one longitudinal gap is not enclosed by the at least two of the plurality of claw portions;

at least a portion of the item is displaced between the at least one pair of claw portions through the longitudinal gap and into the second portion of the attachment chamber;

at least a portion of the locating device is arranged within the first portion of the attachment chamber;

with the locating device arranged within the first portion of the attachment chamber, the claw portions engage the locating device to inhibit movement of the locating device relative to the clip; and with the locating device arranged within the first portion of the attachment chamber and the item arranged within the second portion of the attachment chamber, the locating device engages the item such that the item engages the base portion to inhibit movement of the item and the locating device relative to the clip.

18. A locating system as recited in claim 17, in which at least one base opening is formed in the base portion.

19. A locating system as recited in claim 17, in which the base comprises:

first and second longitudinal bridge portions;

first and second lateral bridge portions; and first and second pairs of claw portions.

20. A locating system as recited in claim 19, in which:

first and second longitudinal bridge portions are resiliently deformable; and first and second lateral bridge portions are resiliently deformable; and the first and second pairs of claw portions are resiliently deformable.

* * * * *